United States Patent
Baek et al.

(10) Patent No.: US 9,461,294 B2
(45) Date of Patent: Oct. 4, 2016

(54) BATTERY PACK

(71) Applicant: SAMSUNG SDI CO., LTD., Yongin-si, Gyeonggi-do (KR)

(72) Inventors: Woon-Seong Baek, Yongin-si (KR); Sang-Il Yi, Yongin-si (KR); Se-Jin Ji, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 92 days.

(21) Appl. No.: 14/477,609

(22) Filed: Sep. 4, 2014

(65) Prior Publication Data

US 2015/0086846 A1 Mar. 26, 2015

(30) Foreign Application Priority Data

Sep. 23, 2013 (KR) ........................ 10-2013-0112471

(51) Int. Cl.
*H01M 2/20* (2006.01)
*H01M 2/10* (2006.01)
*H01M 2/30* (2006.01)

(52) U.S. Cl.
CPC ........... *H01M 2/206* (2013.01); *H01M 2/1077* (2013.01); *H01M 2/307* (2013.01)

(58) Field of Classification Search
CPC .................... H01M 2220/20; H01M 2220/30; H01M 2/1016; H01M 2/105; H01M 2/1077; H01M 2/202; H01M 2/204; H01M 2/206
See application file for complete search history.

(56) References Cited

U.S. PATENT DOCUMENTS

| | | | | |
|---|---|---|---|---|
| 5,744,260 A * | 4/1998 | Sim | ...................... | H01M 2/105 429/100 |
| 6,221,524 B1 * | 4/2001 | Andrew | ................ | H01M 2/263 429/161 |
| 2003/0141842 A1 * | 7/2003 | Izawa | ................... | H01M 2/206 320/116 |
| 2003/0211382 A1 * | 11/2003 | Aoyama | ............... | H01M 2/105 429/96 |
| 2008/0286647 A1 * | 11/2008 | Naito | ................... | H01M 2/105 429/149 |
| 2009/0297892 A1 * | 12/2009 | Ijaz | ...................... | B23K 26/242 429/7 |
| 2011/0003193 A1 * | 1/2011 | Park | ...................... | H01M 2/105 429/159 |
| 2011/0059352 A1 * | 3/2011 | Lee | ..................... | H01M 2/0202 429/164 |
| 2011/0117412 A1 * | 5/2011 | Park | ...................... | H01M 2/202 429/121 |
| 2011/0177365 A1 * | 7/2011 | Yasui | .................... | H01M 2/105 429/61 |
| 2011/0262777 A1 * | 10/2011 | Choi | ..................... | H01M 2/204 429/7 |
| 2012/0045665 A1 * | 2/2012 | Park | ................... | H01M 2/1022 429/7 |
| 2012/0107651 A1 * | 5/2012 | Hotta | .................... | H01M 2/202 429/61 |
| 2012/0129040 A1 * | 5/2012 | Hwang | ............... | H01M 2/1016 429/158 |
| 2012/0270097 A1 * | 10/2012 | Yasui | .................. | H01M 2/1016 429/160 |

FOREIGN PATENT DOCUMENTS

| | | |
|---|---|---|
| KR | 10-2013-0004840 | 1/2013 |
| KR | 10-2013-0055425 | 5/2013 |

* cited by examiner

*Primary Examiner* — Carlos Barcena

(74) *Attorney, Agent, or Firm* — Lewis Roca Rothgerber Christie LLP

(57) ABSTRACT

A battery pack including: a plurality of battery cells; a case configured to accommodate the battery cells spaced from one another at an interval; and at least one tab configured to electrically connect the plurality of battery cells, and a terminal coupling portion is formed at a side of the tab.

11 Claims, 4 Drawing Sheets

BATTERY PACK

CROSS-REFERENCE TO RELATED APPLICATION

This application claims priority to and the benefit of Korean Patent Application No. 10-2013-0112471, filed on Sep. 23, 2013 in the Korean Intellectual Property Office, the entire content of which is incorporated herein by reference.

BACKGROUND

1. Field

Aspects of embodiments of the present invention relate to a battery pack.

2. Description of the Related Art

As industries of electronics, communications, and the like are rapidly developed, the spread of portable electronic devices, such as a camcorder, a cellular phone, and a notebook PC has recently been increased. Accordingly, the use of secondary batteries has also been increased. Secondary batteries can be used not only for portable electronic devices, but also for medium- and large-sized apparatuses such as an electric tool, an automobile, a space transportation means, a motorbike, a motor scooter, and an aerial transportation means, which require high output and high power. The secondary batteries used for the medium- and large-sized apparatuses constitute a large-capacity battery module or battery pack by connecting a plurality of battery cells in series or parallel.

The battery pack can be configured with a plurality of battery cells. The battery cell transfers energy to an external electronic device through an electrochemical reaction therein. Various studies have been conducted to stably and efficiently transfer high current flowing between a plurality of batteries to an external electronic device.

SUMMARY

According to an aspect of embodiments of the present invention, in a battery pack, a plurality of battery cells can be electrically connected simply. According to another aspect of embodiments of the present invention, in a battery pack, a plurality of battery cells can be safely connected without any safety element and without any protective circuit module.

According to another aspect of embodiments of the present invention, in a battery pack, a plurality of battery cells are closely fastened.

According to another aspect of embodiments of the present invention, in a battery pack, a plurality of battery cells can be accommodated at an interval (e.g., a predetermined interval).

According to one or more embodiments of the present invention, a battery pack includes: a plurality of battery cells; a case configured to accommodate the battery cells spaced from one another at an interval; and at least one tab configured to electrically connect the plurality of battery cells, and a terminal coupling portion is formed at a side of the tab.

The battery pack may further include a terminal case coupled to a top side of the case; and a terminal positioned at an upper portion of the terminal case, to be connected to the terminal coupling portion.

The terminal coupling portion may be protruded upward from a side of a tab of the at least one tab, and the terminal coupling portion may be protruded in a vertically bent shape.

The battery pack may further include: a fastening nut fastened to the terminal at a lower portion of the terminal coupling portion; a nut fixing member configured to fix the position of the fastening nut by accommodating the fastening nut therein; and a fastening bolt coupled to the fastening nut through a bolt coupling hole of the terminal.

A fixing groove having a shape corresponding to that of a lower portion of the terminal may be formed on an upper surface of the terminal case, and the terminal may be fixed to the terminal case at the fixing groove.

The terminal may include an inserting portion at the lower portion of the terminal and received in the fixing groove, the bolt coupling hole to receive the fastening bolt, and a terminal hole formed in at least one surface of the terminal.

The case may include accommodating holes having a shape corresponding to that of the battery cells, and the battery cells may be accommodated in the accommodating holes at the interval.

The plurality of battery cells may have a 4S2P structure.

The battery pack may further include a lower case coupled to a lower portion of the case.

The at least one tab may include: a first tab configured to connect a first column of the battery cells, the first tab having the terminal coupling portion formed thereon; a second tab configured to connect second and third columns of the battery cells; a third tab configured to connect a fourth column of the battery cells, the third tab having another terminal coupling portion formed thereon; a fourth tab configured to connect the first and second columns of the battery cells; and a fifth tab configured to connect the third and fourth columns of the battery cells, and the first, second, and third tabs may be positioned on an upper surface of the case, and the fourth and fifth tabs may be positioned on a lower surface of the case.

The terminal coupling portion and the another terminal coupling portion may be bent in different directions from each other.

The second, fourth, and fifth tabs may be formed in a flat plate shape, a through-hole may be formed at a center of each of the second, fourth, and fifth tabs, and contact terminals contacting a surface of respective ones of the battery cells may be formed around the through-hole.

As described above, according to aspects of embodiments of the present invention, in the battery pack, the plurality of battery cells can be electrically connected simply, the assembling of the battery pack is facilitated, and energy efficiency is improved.

According to another aspect of embodiments of the present invention, in the battery pack, the plurality of battery cells can be closely fastened, thereby preventing or substantially preventing an accident such as overcharging or over-discharging.

According to another aspect of embodiments of the present invention, in the battery pack, the plurality of battery cells can be accommodated at an interval (e.g., a predetermined interval), and it is unnecessary to accommodate a protection circuit. Accordingly, it is possible to reduce material cost and to implement the miniaturization of the battery pack.

BRIEF DESCRIPTION OF THE DRAWINGS

Some example embodiments of the present invention are described more fully hereinafter with reference to the accompanying drawings; however, the present invention may be embodied in different forms and should not be construed as limited to the embodiments set forth herein.

Rather, the accompanying drawings, together with the specification, illustrate some example embodiments of the present invention, and serve to explain principles and aspects of the present invention.

In the drawing figures, dimensions may be exaggerated for clarity of illustration. Like reference numerals refer to like elements throughout.

FIG. 1 is a perspective view of a battery pack according to an embodiment of the present invention.

FIG. 2 is an exploded perspective view of the battery pack of FIG. 1.

FIG. 3 is a perspective view of a tab and a terminal coupling portion of the battery pack of FIG. 1, according to an embodiment of the present invention.

FIG. 4 is an enlarged perspective view of a terminal of the battery pack of FIG. 1, according to an embodiment of the present invention.

FIG. 5 is an exploded perspective view of a portion of the battery pack of FIG. 1, according to an embodiment of the present invention.

DETAILED DESCRIPTION

In the following detailed description, certain exemplary embodiments of the present invention are shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. It will be understood that when an element is referred to as being "between" two elements, it can be the only element between the two elements, or one or more intervening elements may also be present. In addition, when an element is referred to as being "on" another element, it can be directly on the another element or indirectly on the another element with one or more intervening elements interposed therebetween. Similarly, when an element is referred to as being "connected to" another element, it can be directly connected to the another element or indirectly connected to the another element with one or more intervening elements interposed therebetween.

Figure 1:
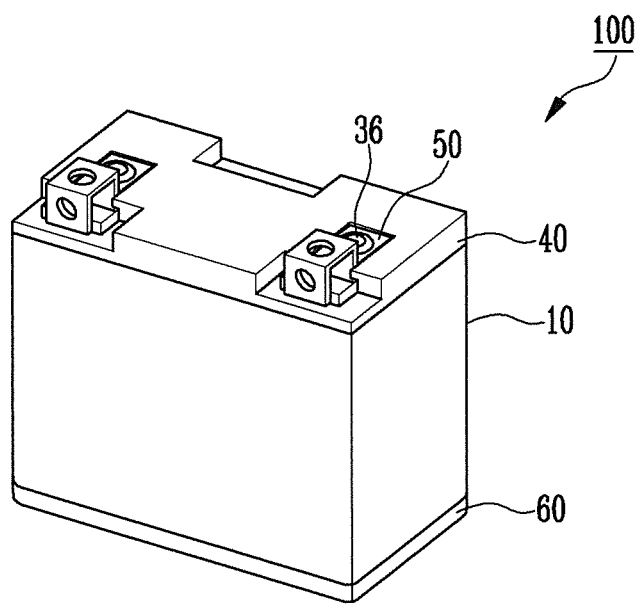
Figure 2:
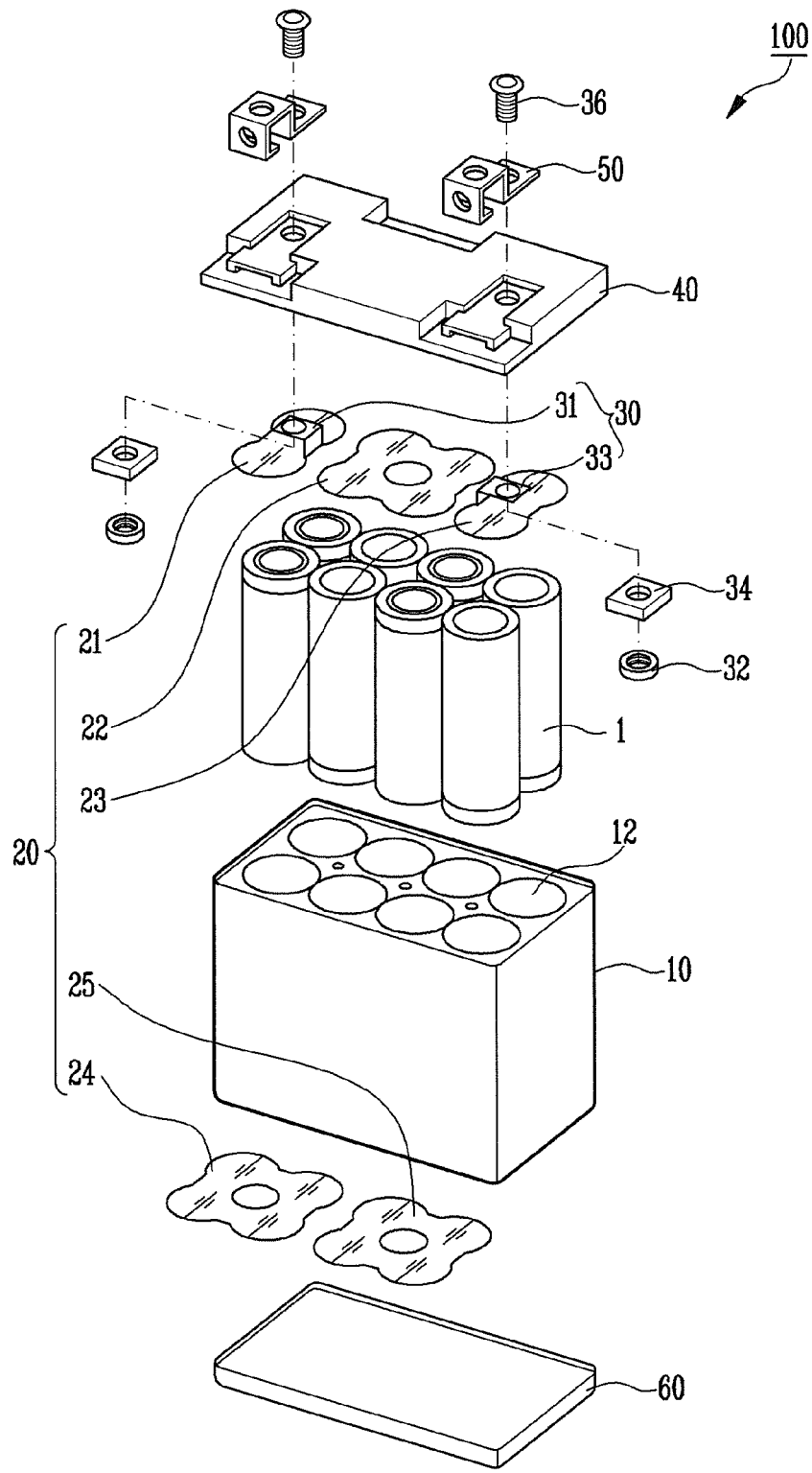

FIG. 1 is a perspective view of a battery pack according to an embodiment of the present invention. FIG. 2 is an exploded perspective view of the battery pack of FIG. 1.

As shown in FIGS. 1 and 2, a battery pack 100 according to an embodiment of the present invention includes a plurality of battery cells 1, a case 10 configured to accommodate the plurality of battery cells 1 at an interval (e.g., a predetermined interval), at least one tab 20 configured to electrically connect the plurality of battery cells 1, and a terminal coupling portion 30 coupled to one side of the tab 20.

The battery cell 1, in one embodiment, is made of a lithium-ion (Li-ion) material and formed in a cylindrical shape, to store electrical energy. Although a 4S2P structure of the battery cells 1 is shown in FIG. 2, the number and arrangement of the battery cells according to embodiments of the present invention are not limited to the structure shown in FIG. 2.

The case 10, in one embodiment, is formed in a generally rectangular shape, and accommodates the plurality of battery cells 10 at an interval (e.g., a predetermined interval), thereby preventing or substantially preventing the occurrence of a short circuit.

Accommodating holes 12 are formed in the case 10 so that the plurality of battery cells 1 can be accommodated at the interval (e.g., the predetermined interval) in the case 10. The accommodating hole 12, in one embodiment, has a shape corresponding to that of the battery cell 1, such as a vertically cylindrical shape. The accommodating holes 12, in one embodiment, are formed corresponding to the shape and number of the battery cells 1. However, the shapes and sizes of the battery cell 1 and the accommodating hole 12 are not limited to the structure shown in FIG. 2. That is, in another embodiment, the battery cell 1 and the accommodating hole 12 may be manufactured having different shapes and sizes.

In one embodiment, a buffer surface made of an elastic material is further formed on an inner circumferential surface of the accommodating hole 12 so that the battery cell 1 is stably accommodated in the accommodating hole 12.

Figure 3:
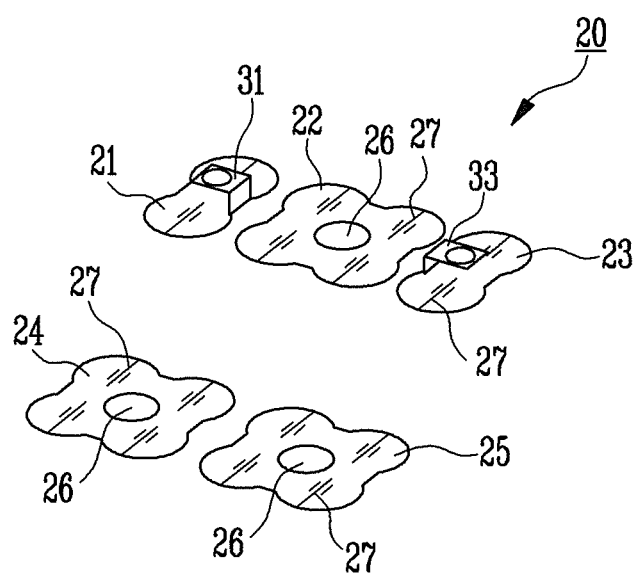

FIG. 3 is a perspective view showing the tab 20 and the terminal coupling portion 30, according to an embodiment of the present invention.

As shown in FIG. 3, the tab 20 is formed in a flat plate shape, using a conductive material. The tab 20, in one embodiment, is formed having a shape (e.g., a curved shape) corresponding to the outer circumferences of the battery cells 1. The tab 20 is positioned on an upper or lower surface of the case 10 to electrically connect the battery cells 1. The tab 20, in one embodiment, includes first, second, and third tabs 21, 22, and 23 positioned on the upper surface of the case 10. Here, the first tab 21 connects a first column of the battery cells 1, the second tab 22 connects second and third columns of the battery cells 1, and the third tab 23 connects a fourth column of the battery cells 1. The tab 20, in one embodiment, further includes fourth and fifth tabs 24 and 25 positioned on the lower surface of the case 10. Here, the fourth tab 24 connects the first and second columns of the battery cells 1, and the fifth tab 25 connects the third and fourth columns of the battery cells 1.

The second, fourth, and fifth tabs 22, 24, and 25 are formed in a flat plate shape using a conductive material, and a through-hole 26 may be formed at a center of each of the second, fourth, and fifth tabs 22, 24 and 25. Contact terminals 27 respectively contacted with surfaces of the battery cells 1 to enable the battery cells 1 to be electrically connected to the tab 20 are formed around the through-hole 26. The contact terminals 27 are formed in the tab 20 to be spaced apart from each other at a an interval (e.g., a predetermined interval), and the through-hole 26 is formed, so that it is possible to reduce the risk of a short circuit.

The terminal coupling portion 30 is protruded upward from one side of an upper surface of the tab 20. In one embodiment, the terminal coupling portion 30 is protruded upward from one side of a central portion of the first or third tab 21 or 23. In one embodiment, the terminal coupling portion 30 is formed to protrude in a vertically bent shape.

The terminal coupling portion 30, in one embodiment, includes a first terminal coupling portion 31 formed on the first tab 21 and a second terminal coupling portion 33 formed on the third tab 23. The first and second terminal coupling portions 31 and 33, in one embodiment, are bent in different directions (e.g., opposite directions) toward an outside of the case 10. However, although it is illustrated in FIGS. 2 and 3 that the first and second terminal coupling portions 31 and 33 are bent in different directions, the present invention is not limited thereto. That is, the terminal coupling portion 30 may be bent in any direction as long as the terminal coupling portion 30 is positioned on a same line as a bolt coupling hole 54 provided in a terminal 50, to be fastened to the bolt coupling hole 54 by a fastening bolt 36.

The terminal coupling portion 30 includes a through-hole through which the fastening bolt 36 passes so that a fastening nut 32 described later and the fastening bolt 36 can be fastened to each other.

In one embodiment, the fastening nut 32 and a nut fixing member 34 are arranged at a lower portion of the terminal coupling portion 30 so that the terminal coupling portion 30 can be fastened to the terminal 50 described later. In one embodiment, the nut fixing member 34 fixes the position of the fastening nut 32 by accommodating the fastening nut 32 therein.

The fastening nut 32, in one embodiment, is formed smaller than the nut fixing member 34, to be accommodated in an accommodating portion provided in the nut fixing member 34.

Since the nut fixing member 34, in one embodiment, is provided as described above, the nut fixing member 34 can be used regardless of the size or kind of the fastening nut 32. Thus, the fastening nut 32 can be closely fixed to the lower portion of the terminal coupling portion 30. Accordingly, when the terminal 50 and the terminal coupling portion 30 are fastened by the fastening bolt 36, the fastening between the terminal 50 and the terminal coupling portion 30 can be easily performed.

In another embodiment, the nut fixing member 34 may have a screw thread formed in the internal surface thereof. Here, the screw thread corresponds to that of the fastening bolt 36. Accordingly, the terminal 50 and the terminal coupling portion 30 can be fastened though a simple bolting operation without using the fastening nut 32.

A terminal case 40 is coupled to the case 10 at a top side of the case 10, and the terminal 50 may be provided at an upper portion of the terminal case 40.

The terminal case 40 is positioned above the case 10 and the tab 20. The terminal case 40 is made of a conductive material. In addition, a fixing groove 42 is formed at one side of an upper surface of the terminal case 40 so that the terminal 50 can be fixed to the terminal case 40. In one embodiment, the fixing groove 42 has a shape corresponding to that of a lower portion of the terminal 50. Since the fixing groove 42 is formed in the terminal case 40 as described above, the terminal 50 can be easily coupled to the terminal case 40 without another operation such as bolting, welding, or soldering.

Figure 4:
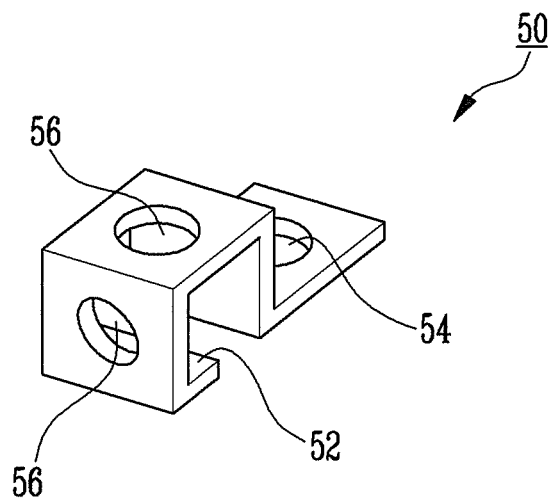

FIG. 4 is an enlarged view of the terminal 50, according to an embodiment of the present invention.

As shown in FIG. 4, in one embodiment, an inserting portion 52 and the bolt coupling hole 54 are formed at a lower portion of the terminal 50. The inserting portion 52 is coupled to the fixing groove 42 of the terminal case 40, and the fastening bolt 36 is coupled through the bolt coupling hole 54.

The terminal 50 is coupled to a side of the terminal case 40 to transfer current applied from the battery cells 1 to the outside of the battery pack 100.

The inserting portion 52, in one embodiment, is formed in a shape corresponding to that of the fixing groove 42. Thus, the inserting portion 52 may be closely coupled to the terminal case 40 by being mounted in the fixing groove 42.

The bolt coupling hole 54 is formed at one end of the terminal 50 to have a size corresponding to that of the fastening bolt 36. Thus, the fastening bolt 36 can be fastened to the fastening nut 32 of the terminal coupling portion 30 by passing through the bolt coupling hole 54.

In one embodiment, a terminal hole 56 is formed in at least one surface of the terminal 50 to facilitate coupling of the terminal 50 with an external terminal. Since the terminal hole 56 is formed as described above, the current applied from the battery cell 1 can be rapidly transferred to the outside of the battery pack 100. Thus, it is possible to decrease resistance according to the length of the battery pack, thereby reducing loss of power.

The battery pack 100 according to one embodiment may further include a plate-shaped lower case 60 provided at a lower portion of the case 10.

Since the lower case 60 is provided as described above, the fourth and fifth tabs 24 and 25 positioned beneath the battery cells 1 to be electrically connected to the battery cells 1 can be fixed at predetermined positions, thereby preventing or substantially preventing the risk of a short circuit.

Figure 5:
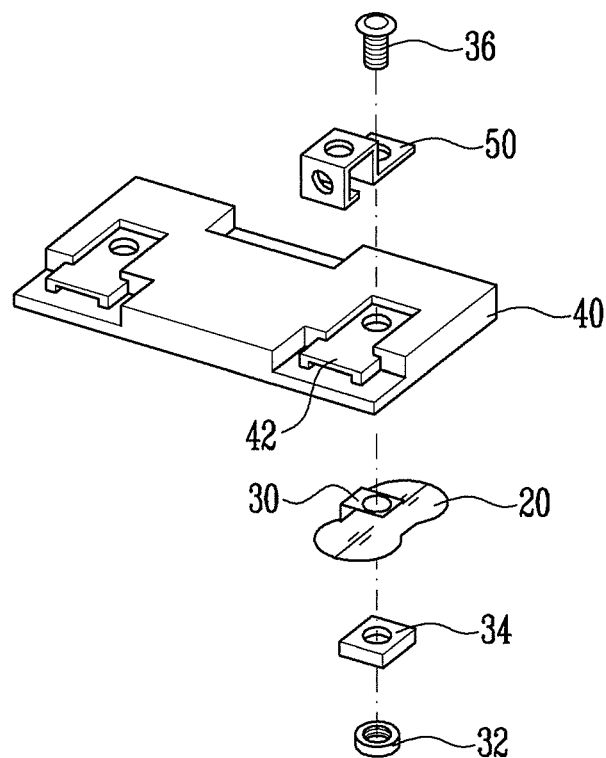

FIG. 5 is an exploded perspective view of a portion of the battery pack 100, according to an embodiment of the present invention.

As shown in FIG. 5, in one embodiment, the bolt coupling hole formed in the terminal 50, and the through-holes of the terminal coupling portion 30 and the fastening nut 32 are positioned on the same line, and the terminal coupling portion 30 and the terminal 50 are fastened by the fastening bolt 36.

As described above, in the battery pack according to embodiments of the present invention, a plurality of battery cells can be electrically connected simply, and it is possible to facilitate the assembling of the battery pack and to improve energy efficiency. In addition, the plurality of battery cells can be closely fastened, thereby preventing or substantially preventing an accident such as overcharging or over-discharging.

Further, the plurality of battery cells can be accommodated at an interval (e.g., a predetermined interval), and it is unnecessary to accommodate a protection circuit. Accordingly, it is possible to reduce material cost and to implement the miniaturization of the battery pack.

While the present invention has been described in connection with certain exemplary embodiments, it is to be understood that the invention is not limited to the disclosed embodiments. Although specific terms are employed, they are used and are to be interpreted in a generic and descriptive sense only and not for purpose of limitation. In some instances, as would be apparent to one of ordinary skill in the art, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims and equivalents thereof.

What is claimed is:

1. A battery pack comprising:
   a plurality of battery cells;
   a case configured to accommodate the battery cells spaced from one another at an interval;
   at least one tab configured to electrically connect the plurality of battery cells;
   a terminal coupling portion at a side of a tab of the at least one tab;
   a terminal case coupled to a top side of the case;
   a terminal positioned at an upper portion of the terminal case, to be connected to the terminal coupling portion; and
   a fastening bolt configured to connect the terminal to the terminal coupling portion by passing through each of a bolt coupling hole of the terminal and a through-hole of the terminal coupling portion, the terminal coupling portion being positioned at a lower portion of the terminal case opposite the upper portion.

2. The battery pack of claim 1,
wherein the terminal coupling portion is protruded upward from a side of the tab of the at least one tab, and
wherein the terminal coupling portion is protruded in a vertically bent shape.

3. The battery pack of claim 1, further comprising:
a fastening nut fastened to the terminal at a lower portion of the terminal coupling portion; and
a nut fixing member configured to fix the position of the fastening nut by accommodating the fastening nut therein,
wherein the fastening bolt is coupled to the fastening nut through the bolt coupling hole of the terminal.

4. The battery pack of claim 3, wherein a fixing groove having a shape corresponding to that of a lower portion of the terminal is formed on an upper surface of the terminal case, and the terminal is fixed to the terminal case at the fixing groove.

5. The battery pack of claim 4, wherein the terminal includes an inserting portion at the lower portion of the terminal and received in the fixing groove, the bolt coupling hole to receive the fastening bolt, and a terminal hole formed in at least one surface of the terminal.

6. The battery pack of claim 1, wherein the case includes accommodating holes having a shape corresponding to that of the battery cells, and the battery cells are accommodated in the accommodating holes at the interval.

7. The battery pack of claim 6, wherein the plurality of battery cells have a 4S2P structure.

8. The battery pack of claim 1, further comprising a lower case coupled to a lower portion of the case.

9. The battery pack of claim 1, wherein the at least one tab comprises:
a first tab configured to connect a first column of the battery cells, the first tab having a first terminal coupling portion formed thereon;
a second tab configured to connect second and third columns of the battery cells;
a third tab configured to connect a fourth column of the battery cells, the third tab having another terminal coupling portion formed thereon;
a fourth tab configured to connect the first and second columns of the battery cells; and
a fifth tab configured to connect the third and fourth columns of the battery cells,
wherein the first, second, and third tabs are positioned on an upper surface of the case, and the fourth and fifth tabs are positioned on a lower surface of the case.

10. The battery pack of claim 9, wherein the terminal coupling portion and the another terminal coupling portion are bent in different directions from each other.

11. The battery pack of claim 9,
wherein the second, fourth, and fifth tabs are formed in a flat plate shape, and
wherein a through-hole is formed at a center of each of the second, fourth, and fifth tabs, and contact terminals contacting a surface of respective ones of the battery cells are formed around the through-hole.

* * * * *